United States Patent [19]

Nishizawa et al.

[11] Patent Number: 4,657,961

[45] Date of Patent: Apr. 14, 1987

[54] PROCESS FOR FORMING PHOSPHOR SCREEN OF CATHODE RAY TUBE

[75] Inventors: Masahiro Nishizawa; Hiroshi Yokomizo; Kiyoshi Miura; Osamu Sasaya, all of Mobara, Japan

[73] Assignee: Hitachi, Ltd., Tokyo, Japan

[21] Appl. No.: 397,902

[22] Filed: Jul. 13, 1982

[30] Foreign Application Priority Data

Jul. 20, 1981 [JP] Japan ................................ 56-112166

[51] Int. Cl.$^4$ ................................................ C08K 5/12

[52] U.S. Cl. ....................................... 524/297; 427/68

[58] Field of Search ................................ 524/296, 297

[56] References Cited

U.S. PATENT DOCUMENTS

| | | | |
|---|---|---|---|
| 2,934,509 | 4/1960 | Crissey | 524/297 |
| 2,946,702 | 7/1960 | Bach | 524/297 |
| 3,194,777 | 7/1965 | Christenson | 524/296 |
| 3,701,746 | 10/1972 | Johnson | 524/296 |
| 4,257,904 | 3/1981 | Anderson | 524/297 |
| 4,378,445 | 3/1983 | Brasen | 524/297 |

*Primary Examiner*—Paul R. Michl

*Attorney, Agent, or Firm*—Antonelli, Terry & Wands

[57] ABSTRACT

In a phosphor screen of cathode ray tube produced by forming a lacquer film between phosphor layers and a metallic film, when the lacquer film is formed by using a composition comprising a resin component, an organic solvent and a plasticizer in an amount of about 12 to 60% by weight based on the weight of the resin component, the resulting phosphor screen is excellent in adhesive strength of the metallic film and can prevent color mixing and halation.

7 Claims, 4 Drawing Figures

PROCESS FOR FORMING PHOSPHOR SCREEN OF CATHODE RAY TUBE

This invention relates to a process for producing phosphor screen of cathode ray tube, particularly to a process for forming a thin organic coating film (a lacquer film) as an undercoating for metal backing by a spraying method, and to a composition used therefor.

Such a lacquer film has heretofore been formed by a process comprising coating phosphor layers with a water film and then spraying thereon a film-forming composition.

However, although the lacquer film formed by such a process is high in flatness, it cannot be sufficiently high in adhesion, and when aluminum is evaporated onto the lacquer film and baked to form a metal backing film, no sufficient adhesive strength can be obtained, and halation takes place in spaces between the phosphor layers and the metal backing film, which has been a cause of color mixing.

Figure 1:
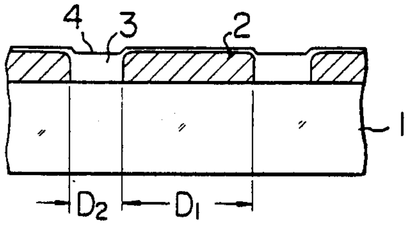

Such a tendency is marked particularly when phosphor layers of their respective colors are formed not by a slurry method but by attachment of powdery phosphors to an adhesive layer. This is because as shown in FIG. 1, according to this method, the phosphor layers 2 of individual colors are formed apart from one another on the inner surface of the faceplate panel portion 1, so that narrow gaps 3 tend to be formed between the phosphor layers. For example, when the width $D_1$ of the phosphor layer 2 is 150 μm and the width $D_2$ of the gap is 60 μm, a lacquer film 4 cannot enter the gap 3, so that a vacant space is formed.

This invention provides a process for producing phosphor screen of cathode ray tube which comprises a step of forming a lacquer film good in adhesion to phosphor layers and has overcome the defect described above, and a film-forming composition used for producing said phosphor screen.

In accordance with this invention, there is provided a process for producing phosphor screen of cathode ray tube comprising a step of forming a lacquer film by spraying a film-forming composition on phosphor layers formed on the inner surface of a faceplate panel portion and then drying it, characterized in that a composition containing a plasticizer in an amount of about 12 to 60% by weight based on the weight of a resin component of the composition is used as the aforesaid film-forming composition, and there is also provided a film-forming composition used for producing said phosphor screen.

Figure 2:
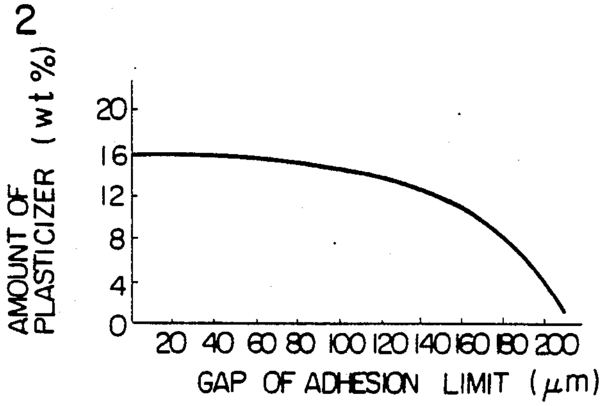
Figure 3:
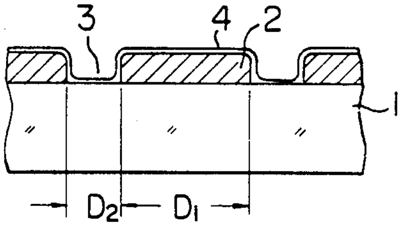
Figure 4:
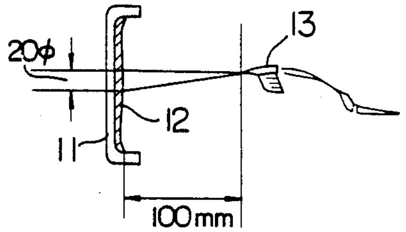

In the attached drawings, FIG. 1 is a cross-sectional view showing on example of a phosphor screen produced by a conventional process, FIG. 2 is a graph showing a relationship between the amount of the plasticizer based on the weight of a resin component in a film-forming composition and a gap of adhesion limit, FIG. 3 is a cross-sectional view showing one example of a phosphor screen produced according to this invention, and FIG. 4 is a sketch showing a method of a phosphor screen breaking test.

In this invention, layers of each of red-emitting, green-emitting and blue-emitting phosphors are formed on the faceplate panel portion by a usual method, for example, a dry phosphor deposition method or a slurry application method, and a film-forming composition having a special composition is sprayed on said phosphor layers and dried, after which a metal backing is provided on the resulting film by a usual method, for instance, aluminum is provided by vacuum evaporation (aluminizing) and then said metal backing is subjected to a baking step, whereby a phosphor screen of cathode ray tube is produced.

The aforesaid film-forming composition having a special composition comprises a resin component, an organic solvent and a plasticizer.

As the resin component, one or more acrylates and/or methacrylate resins are preferably used.

As the organic solvent, there can be used conventionally used aliphatic hydrocarbons, aromatic hydrocarbons, chlorinated aromatic hydrocarbons, chlorinated saturated aliphatic hydrocarbons, chlorinated unsaturated aliphatic hydrocarbons, alicyclic hydrocarbons, esters, ketones, ethers, glycol derivatives, for example, toluene, ethyl acetate, methyl ethyl ketone, cyclohexane, chloroform, xylene, dichloroethylene, trichloroethylene, and the like. These solvents may be used alone or as a mixture thereof.

The resin component is used preferably in an amount of 2 to 10% by weight, more preferably 3 to 6% by weight based on the sum of weights of the organic solvent and the resin component.

The plasticizer is a solvent having a relatively low volatility and is generally used as additive for polymer materials in order to reduce their melt viscosity, to lower their processing temperature, to increase their plasticity at the time of molding and processing at high temperatures, and to reduce their elastic modulus and glass transition property to impart to them flexibility and impact resistance at room temperature. In the film-forming compositions for spraying described above, plasticizers have heretofore been added in an amount as small as only 1 to 2% by weight based on the weight of the resin (e.g., Japanese Patent Appln Kokoku (Post-Exam Publn) No. 20008/73). This invention has made it possible to improve the adhesion of the lacquer film to the phosphor layers greatly by extremely increasing the adding amount of such a plasticizer to 12 to 60% by weight based on the weight of the resin component. As such plasticizers, phthalic acid esters are preferred, and concretely, there may be used dibutyl phthalate, di-n-octyl phthalate, diisoctyl phthalate, di-2-ethylhexyl phthalate, octyldecyl phthalate, and the like. Among them, dibutyl phthalate, is particularly preferred.

The amount of the plasticizer varies depending upon the width of gaps between the phosphor layers. For example, in order to form a lacquer film 4 so that it may not form vacant spaces between it and phosphor layers 2 as shown in FIG. 3, the plasticizer is needed in an amount of about 15% by weight or more based on the weight of the resin component in the composition when $D_2$ is, for example, about 100 μm. When $D_2$ is, for example 10 μm or less, an amount of about 16% by weight or more is needed. On the other hand, when the amount of the plasticizer exceeds 60% by weight based on the weight of the resin component in the composition, the resulting lacquer film undesirably is not uniform and has pin holes and wrinkles, so that the reflectivity of the metal backing film is greatly lowered.

The film-forming composition is formed into a lacquer film, by a spraying method, on the phosphor layers formed on the faceplate panel portion. The thus formed lacquer film is dried, and aluminum is evaporated onto it by a usual method and baked, whereby a phosphor screen of cathode ray tube is produced.

This invention is explained below in detail referring to Examples.

EXAMPLE 1

Polyisobutyl methacrylate: 5 parts by weight
Acrylic resin: 0.1 parts by weight
Toluene: 50 parts by weight
Ethyl acetate: 44.9 parts by weight
Dibutyl phthalate: (prescribed amount)

By use of a composition consisting of the above-mentioned components, a lacquer film was formed at various widths ($D_2$) of gaps between phosphor layers, and its adhesion was evaluated. As the acrylic resin, Acryloid B-72 (a trademark, manufactured by Rohm & Haas Co.) was used. As a plasticizer, dibutyl phthalate was used.

The results were as shown in FIG. 2. In FIG. 2, the gap of adhesion limit on the axis of abscissa refers to a minimum gap width at which the lacquer film shows adhesion, namely, a minimum gap width at which the lacquer film can enter the gaps. The amount of plasticizer on the axis of ordinate refers to a minimum added amount (% by weight) of the plasticizer based on the weight of polyisobutyl methacrylate in which amount the lacquer film shows adhesion.

As is clear from FIG. 2, when the added amount of the plasticizer is 16% by weight or more, the lacquer film adheres to the phosphor layers even if the gap between the phosphor layers is 10 μm or less. However, when the added amount exceeds 60% by weight, the resulting lacquer film, not shown in the graph, was not uniform and had pin holes and wrinkles, so that the metal backing film had greatly lowered reflectivity.

EXAMPLE 2

A material exhibiting adhesion by exposure was coated onto the inner surface of a faceplate panel portion of a picture tube for 14-inch type color television according to a usual method, and exposure and a step of adhering powdery phosphors to said material were repeated to form stripewise phosphor layers 2 of each of red-emitting, green-emitting and blue-emitting phosphors as shown in FIG. 3. In FIG. 3, the width $D_1$ of the phosphor layer 2 and the width $D_2$ of the gap 3 were 150 μm and 60 μm, respectively, as in FIG. 1. Next, the inner surface of the faceplate panel portion was treated with a 0.1% by weight aqueous polyvinyl alcohol solution with caution so as not to form bubbles, after which the faceplate panel portion was rotated at a rate of 30 revolutions per second for about 10 seconds to shake off the solution. Subsequently, a film-forming solution for spraying having the composition shown below was sprayed on the inner surface of the faceplate panel portion at a pressure of 2.5 Kg/cm$^2$ for 3 seconds from the end of a sprayer placed about 120 mm apart from said inner surface, while the faceplate panel portion was rotated at a rate of 30 revolutions per minute.

Polyisobutyl methacrylate: 5 parts by weight
Acryloid B-72: 0.1 part by weight
Toluene: 50 parts by weight
Ethyl acetate: 43.9 parts by weight
Dibutyl phthalate (a plasticizer): 1 parts by weight Next, the sprayed solution was dried for about 5 minutes by exposing it to warm air at a speed of 0.8 m/sec and a temperature of 40° C., to form a lacquer film 4 as shown in FIG. 3, which film was very good in adhesion.

Aluminum was deposited by vacuum evaporation on the thus formed lacquer film 4 to a thickness of about 2000 Å by a usual method and baked to complete a phosphor screen.

For comparison, a phosphor screen was produced by the same procedure as described above by using the same film-forming composition as described above, except that the plasticizer was added in an amount of 2% by weight based on the weight of polyisobutyl methacrylate (Comparative Example).

A breaking test for the thus obtained phosphor screen was carried out by using the apparatus shown in FIG. 4. In FIG. 4, numeral 11 shows a faceplate, numeral 12 a phosphor screen, and numeral 13 an air gun. High-pressure air at a pressure of 2.5 Kg/cm$^2$ was blown onto the phosphor screen, and the time required for the phosphor screen to be broken was measured. The results were as shown in Table 1.

TABLE 1

| Example No. | Time required for breaking (sec) Maximum | Minimum | Average |
|---|---|---|---|
| Example 2 | 70 | 38 | 45 |
| Comparative Example | 35 | 26 | 30 |

It was found that as shown in Table 1, the phosphor screen had breaking strength improved by about 30% as compared with that of the conventional phosphor screen in which the added amount of the phasticizer was 2% by weight.

EXAMPLE 3

The procedures of Example 2 were repeated except for using dibutyl phthalate in an amount of 50% by weight based on the weight of polyisobutyl methacrylate in place of 20% by weight (1 part/5 parts by weight).

The resulting phosphor screen showed the same excellent properties as in Example 2.

As explained above, according to the process for producing phosphor screen of cathode ray tube of this invention, the film-forming composition for spraying can have a greatly improved adhesion to the phosphor layers by the addition of a plasticizer in an amount of about 12 to 60% by weight based on the weight of the resin component in said composition. As a result, the resulting metal backing film can have an increased adhesive strength, and it becomes possible to prevent the phosphor screen from halation and color mixing taking place in vacant spaces between said metal backing film and the phosphor layers of each color. Such an effect is very useful particularly when there is used a phosphor screen in which phosphor layers of each color are formed apart from one another by a method comprising adhering powdery phosphors to adhesive layers. In this case, the formation of the lacquer film by a conventional spraying method has been disadvantageous in that blue-emitting phosphor layers have lowered brightness, however according to this invention, there is brought about an effect of making it possible to make such a decrease of the brightness small.

What is claimed is:

1. A film-forming composition for producing a lacquer film between phosphor layers and a metallic film in the production of phosphor screen of cathode ray tube, which consists essentially of a resin component, an organic solvent and a plasticizer in an amount of about 12 to 60% by weight based on the weight of the resin component, whereby a film can be formed on the phosphor layers which is strongly adherent and can fill gaps between phosphor layers, and yet which is uniform and does not wrinkle and have pinholes, wherein the resin component is polyisobutyl methacrylate and an acrylic resin, the solvent is toluene and ethyl acetate and the plasticizer is dibutyl phthalate, said composition being a solution of said resin component, said solvent and said plasticizer.

2. A composition according to claim 1, wherein the plasticizer is a solvent for the resin component.

3. A composition according to claim 1, wherein said composition includes 5 parts by weight of polyisobutyl methacrylate and 0.1 parts by weight acrylic resin.

4. A composition according to claim 3, wherein said composition includes 50 parts by weight of toluene and 44.9 parts by weight of ethyl acetate.

5. A composition according to claim 4, wherein said plasticizer is contained in said composition in an amount of 16 to 60% based on the weight of the resin component.

6. A composition according to claim 3, wherein said plasticizer is contained in said composition in an amount of 16 to 60% based on the weight of the resin component.

7. A composition according to claim 1, wherein said plasticizer is contained in said composition in an amount of 16 to 60% based on the weight of the resin component.

* * * * *